US010983807B2

(12) United States Patent
Karthikeyan et al.

(10) Patent No.: US 10,983,807 B2
(45) Date of Patent: *Apr. 20, 2021

(54) OPTIMIZED USER INTERFACE RENDERING

(71) Applicant: INTERNATIONAL BUSINESS MACHINES CORPORATION, Armonk, NY (US)

(72) Inventors: Sailatha Karthikeyan, Bangalore (IN); Dinup P. Pillai, Bangalore (IN); Sachin Prasad, Roundrock, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/518,034

(22) Filed: Jul. 22, 2019

(65) Prior Publication Data

US 2019/0339996 A1 Nov. 7, 2019

Related U.S. Application Data

(63) Continuation of application No. 15/635,931, filed on Jun. 28, 2017, now Pat. No. 10,394,581, which is a continuation of application No. 15/094,050, filed on Apr. 8, 2016, now Pat. No. 10,296,358.

(51) Int. Cl.
*G06F 9/451* (2018.01)
*G06F 8/38* (2018.01)
*G06F 40/103* (2020.01)

(52) U.S. Cl.
CPC ............... *G06F 9/451* (2018.02); *G06F 8/38* (2013.01); *G06F 40/103* (2020.01)

(58) Field of Classification Search
None
See application file for complete search history.

(56) References Cited

U.S. PATENT DOCUMENTS

| | | |
|---|---|---|
| 6,023,715 A | 2/2000 | Burkes |
| 6,813,746 B1 | 11/2004 | O'Shea |
| 7,467,351 B1 | 12/2008 | Spells et al. |
| 8,458,246 B2 | 6/2013 | Guney et al. |
| 8,989,715 B2 | 3/2015 | Carion et al. |
| 10,296,358 B2 | 5/2019 | Karthikeyan |
| 2004/0215719 A1 | 10/2004 | Altshuler |
| 2007/0283036 A1 | 12/2007 | Dey |
| 2012/0144288 A1 | 6/2012 | Caruso |
| 2014/0032642 A1 | 1/2014 | Karthikeyan |

(Continued)

OTHER PUBLICATIONS

IBM: List of IBM Patents or Patent Applications Treated as Related (Appendix P), Aug. 19, 2019, pp. 1-2.

(Continued)

*Primary Examiner* — Maikhanh Nguyen
(74) *Attorney, Agent, or Firm* — Dmitry Paskalov

(57) ABSTRACT

A device identifies one or more functional elements, and one or more device characteristics. The device determines a selection index based on one or more device characteristics. The device determines a first functional element of the one or more functional elements that has a highest priority level. The device determines whether there is an appropriate technology layer for the first functional element based on comparing the selection index to one or more technology layer ranges corresponding to one or more technology layers associated with the first functional element.

17 Claims, 3 Drawing Sheets

(56) References Cited

U.S. PATENT DOCUMENTS

2015/0261425 A1    9/2015   Marusich
2015/0143267 A1   12/2015   Nair
2017/0300344 A1   10/2017   Karthikeyan

OTHER PUBLICATIONS

Disclosed Anonymously, "Context-Configuration-Based Method of Generating Mobile Client for Web Application," An IP.com Prior Art Database Technical Disclosure, IP.com No. 000227711, May 13, 2013, pp. 1-7.

OPTIMIZED USER INTERFACE RENDERING

FIELD OF THE INVENTION

The present invention relates generally to rendering a user interface for a client, and more particularly to optimized user interface rendering based on selective multi-layer UI architecture and a client's hardware capabilities.

BACKGROUND

A user interface (UI) is a space where an interaction between a human (i.e. end user) and a machine (i.e. client) occurs. A UI is generally measured by its efficiency, user experience and ease of use by the client. One example of a UI is a web based UI, where data is transmitted from a server to a client through a network. This data appears to the client as a web page in a browser.

A web page allows rendering of information such as a client-server application, which is the most common web UI, due to its support of cross-platform compatibility. This cross-platform compatibility is achieved because any client who has a browser can view the web page, without installing any additional software on his device.

SUMMARY

Embodiments of the present invention provide a system, method, and program product for an optimized user interface rendering. A device identifies one or more functional elements, and one or more device characteristics. The device determines a selection index based on one or more device characteristics. The device determines a first functional element of the one or more functional elements that has a highest priority level. The device determines whether there is an appropriate technology layer for the first functional element based on comparing the selection index to one or more technology layer ranges corresponding to one or more technology layers associated with the first functional element.

DETAILED DESCRIPTION

Figure 1:
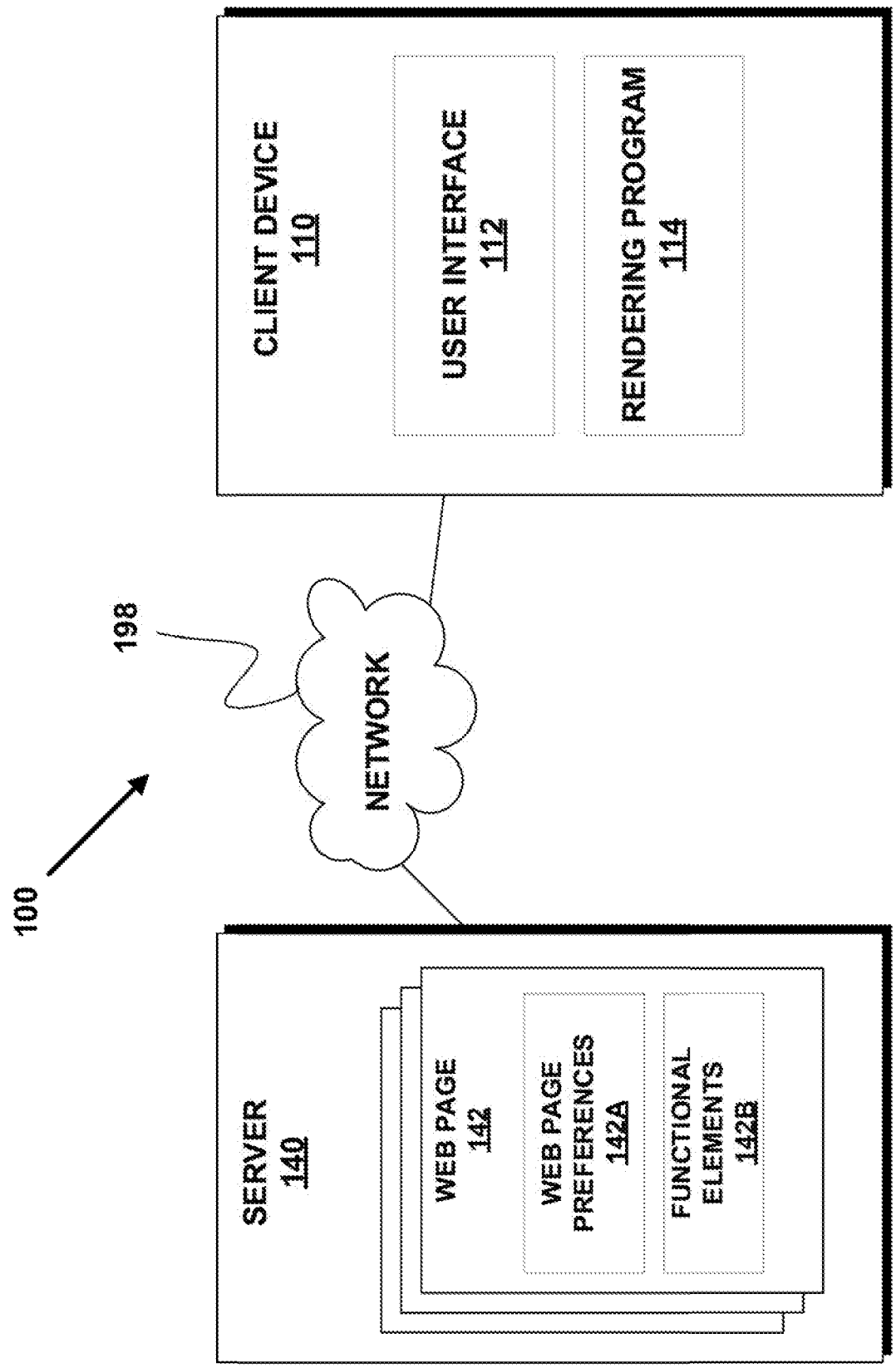
FIG. 1 illustrates a UI rendering system, in accordance with an embodiment of the invention.

FIG. 1 illustrates an optimized user interface (UI) rendering system 100, in accordance with an embodiment of the invention. In an exemplary embodiment, optimized UI rendering system 100 includes a server 140 and a client device 110, interconnected via network 198.

In accordance with an embodiment of the invention, network 198 is the Internet, representing a worldwide collection of networks and gateways to support communications between devices connected to the Internet. Network 198 may include, for example, wired, wireless or fiber optic connections. In other embodiments, network 198 may be implemented as an intranet, a local area network (LAN), or a wide area network (WAN). In general, network 198 can be any combination of connections and protocols that will support communications between server 140 and client device 110.

According to an embodiment, server 140 contains at least one web page, such as web page 142. Server 140 may be a web server, file server, desktop computer, or any other electronic device or computing system capable of receiving and sending data to and from other computing devices such as client device 110 via network 198. Although not shown, optionally, server 140 can comprise a cluster of servers. In an exemplary embodiment, server 140 is a computing device that is optimized for the support of multiple network requests related to the transmittal of web pages through network 198.

Web page 142, stored on server 140, is a web document or an application capable of being rendered on a user interface 112. Web page 142 may be a part of a web site, application or a standalone document and may be implemented in different programming languages defined as technology layers such as HTML, JavaScript® (JavaScript is a registered trademark of ORACLE AMERICA, INC.), Web 2.0® (Web 2.0 is a registered trademark of UBM LLC), Flash® (Flash is a registered trademark of TALMADGE LLC), that may be stored in one or multiple files on a web server 140, for example, HTML files, CSS files, image files, Flash® files, Web 2.0® files, JavaScript® files. In the example embodiment, web page 142, may contain functional elements 142B implemented in various technology layers, and web page preferences 142A that define the rendering priority of each functional element.

In an example embodiment, functional elements 142B are segments of computer software that are seen, heard or interact with the end user such as, for example, textual information, images, audio, interactive illustrations (e.g. advertisements), buttons, forms, chats or hyperlinks. Functional elements 142B may be composed as different technology layers and a web page 142 may contain the same functional element composed in different technology layer. For an example, the same advertisement functional element may be composed in Flash® and in HTML technology layers.

In accordance with the example embodiment, web page preferences 142A include information describing priority for rendering functional elements 142B, such as technology layer index, priority index and rendering index of each element. Web page preferences 142A may be stored as a part of web page 142, or alternatively on server 140, client device 110, incorporated into user interface 112 or stored on an independent server in a network 198. In an example embodiment, rendering program 114 may be stored on a server 140 and define priority of functional elements for all web pages using, for example, a listing of each functional element from most important to least important, in instances where web page preferences 142A are not stored as a part of webpage 142. In another example, rendering program 114 may be stored on an independent server in an internal network, which may provide internal network prioritization for all the end users such as giving high priority to elements that are important to that organization.

In the example embodiment, client device 110 includes user interface 112 and rendering program 114. The client device 110 may be a desktop computer, a notebook, a laptop computer, a tablet computer, a handheld device, a smartphone, a thin client, or any other electronic device or computing system capable of receiving and sending data to and from other computing devices, such as server 140 via network 198.

User interface 112 is a software application capable of receiving transmitted information from a server 140. User interface 112 operates software and hardware components of a client device 110 to transmit information from the client device 110 to the end user. In the example embodiment, user interface 112 is a web browser capable of displaying web page 142 to the end user.

In the example embodiment, rendering program 114 is a software program that optimizes a web page 142 for rendering. In accordance with the embodiment, rendering program 114 receives web page preferences 142A, functional elements 142B, and hardware information from a client device 110. Rendering program 114 determines several indexes based on client device 110 capabilities. Rendering program 114 determines functional elements 142B for rendering based on the priority and technology layer of the functional elements 142B and in accordance with the indexes. Afterwards rendering program 114 resolves the conflicts between the determined functional elements after optimization and transmits the optimized web page 142 for rendering on client device 110. Rendering program 114 can be stored either on client device 110, server 140, as a module or add-on to user interface 112, or on a separate device connected to network 198. The operations and functions of 114 are described in further detail below with regard to FIG. 2.

Figure 2:
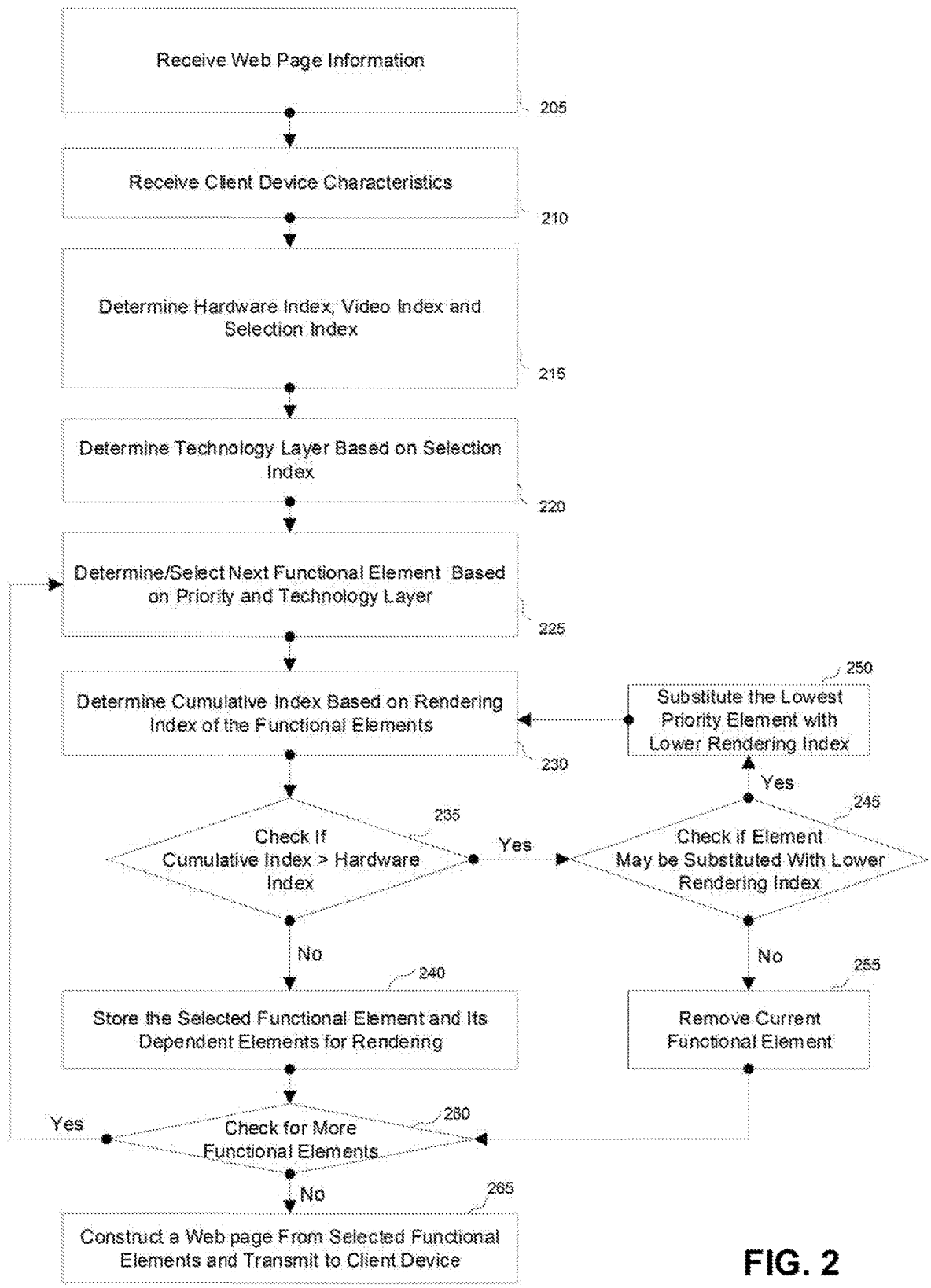
FIG. 2 is a flowchart, illustrating the operations of a rendering program 114, in accordance with an embodiment of the invention.

FIG. 2 is a flowchart illustrating the operations of rendering program 114. Referring to step 205, rendering program 114 receives a web page 142 content, containing functional elements 142B and web page preferences 142A. Functional elements 142B are computer software blocks such as, for example, text, images, buttons, forms etc. Functional elements 142B may be implemented in different technology layers. Technology layers are different programming languages that are used to implement the functional elements 142B such as HTML, JavaScript®, Web 2.0® or Flash®. Web page preferences 142A are a set of instructions for rendering of functional elements 142B and include technology layer index, functional elements priority, rendering index of each functional element and dependent functional element information.

For example, technology layer range, functional elements priority, rendering index and dependent functional element information may be represented in a tables as follows:

TABLE 1

Technology Layer Index

| Technology Layer | Technology Layer Range |
| --- | --- |
| HTML | 0 to 3 |
| JavaScript® | 3 to 5.5 |
| Web 2.0® | 5.5 to 7 |
| Flash® | 7 to 10 |

TABLE 2

Functional Elements Priority and Rendering Index

| Functional Element Name | Technology Layer | Rendering Index | Priority |
| --- | --- | --- | --- |
| Form | HTML | 0.5 | 1 |
| Advertisement | Flash® | 1.2 | 4 |

TABLE 2-continued

Functional Elements Priority and Rendering Index

| Functional Element Name | Technology Layer | Rendering Index | Priority |
| --- | --- | --- | --- |
| Content Spot | Web 2.0® | 1.1 | 2 |
| Form | JavaScript® | 0.8 | 1 |
| Advertisement | Web 2.0® | 0.8 | 4 |
| Content Spot | Flash® | 1.5 | 2 |

TABLE 3

Dependent Functional Element Information

| Functional Element | Dependent Functional Element |
| --- | --- |
| Form | Content Spot |

Referring to step 210, rendering program 114 receives client device 110 characteristics from the operating system of client device 110, and additionally may reference the BIOS and device drivers of client device 110. The characteristics consists of client device 110 hardware parameters such as CPU speed, number of cores, RAM size, GPU speed, VRAM size, screen size, screen resolution, screen aspect ratio etc.

Referring to step 215, rendering program 114 determines hardware, video and selection indexes for the optimization of rendering on a client device 110. Hardware index represents the client device 110 computation capabilities that are required for UI rendering. The hardware index is determined from the client device 110 hardware properties such as processor speed, number of cores, RAM size, GPU speed, VRAM size, etc. In an example embodiment, the hardware index is scaled from 1 to 10 while for example, high index value represents more advanced hardware characteristics, such as personal computer, while low index value represents limited hardware characteristics, such as mobile phone or mobile device. Video index represents video rendering capabilities and is determined by client device 110 screen size, screen resolution, screen aspect ratio, etc. Hardware and Video indexes may be determined, for example, by adding or averaging weighted values associated with each component of client device 110 (or another device). For example, a processor may have an assigned value of 5 based on the processor specifications, such as processor speed (frequency). Furthermore, there may be a weight assigned to the component category of processors based on the importance of the component to the determination of the hardware index (or video index). In this example, a weighted value for the processor is determined by multiplying the assigned weight by the assigned value. Similarly, a weighted value may be determined for each component of client device 110. The weighted values for each component are then averaged to determine the hardware index. Alternatively, the weighted values may be added together to determine the hardware index. The video index can be calculated in a similar manner with respect to video components of client device 110. In the example embodiment, the assigned values and weights associated with each component are pre-determined by a programmer, and can be stored locally, as a part of a rendering program 114, or received from a designated file server via network 198. In another embodiment, hardware and video indexes may be determined by encoding of each hardware component on a bit level of the index number, for example, if the least significant bit (LSB) of the index represents the video acceleration processor of certain graphic card and this processor is present in a client device 110 than LSB is changed to 1, otherwise LSB remains 0. A selection index represents the overall capabilities of the client device 110 and is used for technology layer selection. For example, selection index may be determined by dividing hardware index by video index, and multiplying it by a constant (K) to scale the result.

$$\text{Selection Index} = K \times \frac{\text{Hardware Index}}{\text{Video Index}}$$

Referring to step 220, rendering program 114 determines an appropriate technology layer based on the determined selection index. In accordance with the embodiment, rendering program 114 picks the appropriate technology layer by comparing the selection index to the Table 1—Technology Layer Index in order to determine which pre-defined selection index falls within a specific technology layer index range. For example, if the determined selection index is 6 rendering program 114 chooses Web 2.0® as a technology layer because it is defined from 5.5 to 7. (See Table 1—Technology Layer Index). Therefore, functional element implemented in more burdensome technology layer with a higher corresponding selection layer, such as Flash®, would not be rendered. In other embodiments, the technology layer may be selected by comparing selection index to different pre-defined data that incorporates not only client device 110 hardware capabilities mentioned above but also, for example, hardware parameters from server 140, client device 110 or network 198, such as upload or download speeds, server load, network speed, etc. In other embodiments, technology layer information may be stored on a client device 110, server 140 or received from other device via network 198.

Referring to step 225, rendering program 114 determines a next functional element for rendering by choosing the functional element with lowest priority (See Table 2—Functional Elements Priority and Rendering Index). Rendering program 114 checks if the chosen functional element is implemented in the appropriate technology layer by comparing the chosen functional element's technology layer to appropriate technology layer determined in step 220. If chosen functional element implemented in more burdensome technology layer than pre-determined appropriate technology layer, then rendering program 114 checks if the chosen functional element is implemented in other technology layers and implements the chosen functional element in a technology layer that has an associated technology layer index that is within the range or below the range of the index associated with the appropriate technology layer (determined in step 220). If the chosen functional element is still in a more burdensome technology layer (above the range associated with the appropriate technology layer) the rendering program 114 does not render the chosen element and chooses the next functional element with the lower priority and repeats the process. For example, if the first chosen functional element is a form (form functional element of a form is defined as priority no. 1), and the form is implemented in different technology layers such as HTML and JavaScript®, rendering program 114 compares the highest chosen functional element technology layer index (JavaScript®) to the range associated with the appropriate technology layer (Web 2.0®, example from step 220). Because the chosen functional element technology layer is more burdensome than the appropriate technology layer rendering program will check to substitute the technology layer of the form to a less burdensome technology layer than the appropriate technology layer, such as HTML. In other embodiments, rendering program 114 can remove all the functional elements that are implemented in a technology layer more burdensome than the determined appropriate technology layer and afterwards choose the functional element according to priority from the remaining functional elements.

Referring to step 230, rendering program 114 determines a cumulative index based on the rendering indexes of the determined functional elements. Cumulative index represents the overall computation load required from the client device 110 in order to render the functional elements. Cumulative index is determined by adding up all the rendering indexes of the previously determined functional elements and their dependencies. For example, if the determined functional element was a form implemented in JavaScript® (rendering index 0.8) and the form has a dependent functional element (Table 3—Dependent Functional Element Information) of a content spot implemented in Web 2.0® (rendering index 1.1) then rendering program 114 determines the cumulative index as a sum of all the rendering indexes including dependent functional elements (e.g. 0.8+1.1=1.9). In other embodiments, dependent functional elements can be determined by rendering program 114 and not pre-defined by the web page preferences 142A. For example, rendering program 114 may analyze a web page 142, split it into functional elements, identify the relationships between the elements and construct a dependent functional elements list. In other embodiments, rendering program 114 can prioritize and index functional elements according to pre-defined instructions that are stored in rendering program 114 or received form a server through the network 198.

Referring to step 235, rendering program 114 checks if the determined cumulative index is greater than the determined hardware index. This may enable rendering program 114 to determine whether the added functional element exceeds the hardware capacity of the client device 110. For example, if the functional elements include computations that the client device 110 is incapable of rendering, or if the RAM that is required is not enough, rendering program 114 will bypass the functional element from rendering. If the determined cumulative index is greater than the determined hardware index (decision 235, "Yes" branch), rendering program 114 proceeds to step 245. If the determined cumulative index is not greater than the determined hardware index (decision 235, "NO" branch), rendering program 114 proceeds to step 240.

Referring to step 240, rendering program 114 flags or stores in the memory the determined functional element and its dependencies for final rendering.

Referring to step 260, rendering program 114 determines if there are additional functional elements to be rendered. If there are additional functional elements 142B (decision 260, "YES" branch), rendering program 114 proceeds to step 225. If there are no additional functional elements 142B to be rendered (decision 260, "NO" branch), rendering program 114 proceeds to step 265.

Referring to step 265, rendering program 114 generates an updated web page from the determined, flagged or stored functional elements, and transmits the generated web page to a client device 110 for rendering. The generation includes rendering and layout of the determined functional elements with the corresponding dependent functional elements and generation of complete UI code of an updated web page. After the updated web page is generated rendering program 114 transmits the web page to the client device 110.

Referring to step 245, rendering program 114 checks if any of the determined, flagged or stored functional elements may be substituted with a corresponding functional element of lower rendering index. For example, the determined hardware index is 1.7 and the cumulative index is a sum of a form, implemented in JavaScript® (rendering index 0.8), and a content spot (dependent element) implemented in Web 2.0® (rendering index 1.1) therefore, cumulative index is 1.9. Because cumulative index is greater than rendering index, decision 235 is true and rendering program 114 will refer to step 245 and check if any of the determined, flagged or stored functional elements can be substituted to decrease the cumulative index. In this example, the form functional element may be substituted with the form implemented in HTML (rendering index 0.5), therefore reducing cumulative index to 0.5+1.1=1.6 (less than determined hardware index 1.7). If any of the determined, flagged or stored functional elements may be substituted with a corresponding functional element of lower rendering index rendering program 114 proceeds to step 250. If no functional element may be substituted rendering program 114 proceeds to step 255.

Referring to step 250, when one of the determined, flagged or stored functional elements may be substituted with a corresponding functional element with a lower rendering index, rendering program 114 substitutes the lowest priority functional element that may be substituted with the corresponding functional element of lower rendering index and proceeds to step 230.

Referring to step 255, when none of the determined functional element may be substituted with a lower rendering index, rendering program 114 bypasses the current functional element and all of its dependencies from rendering and proceeds to step 260.

The descriptions of the various embodiments of the present invention i.e. determination of hardware, video and selection indexes in step 215 have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 3:
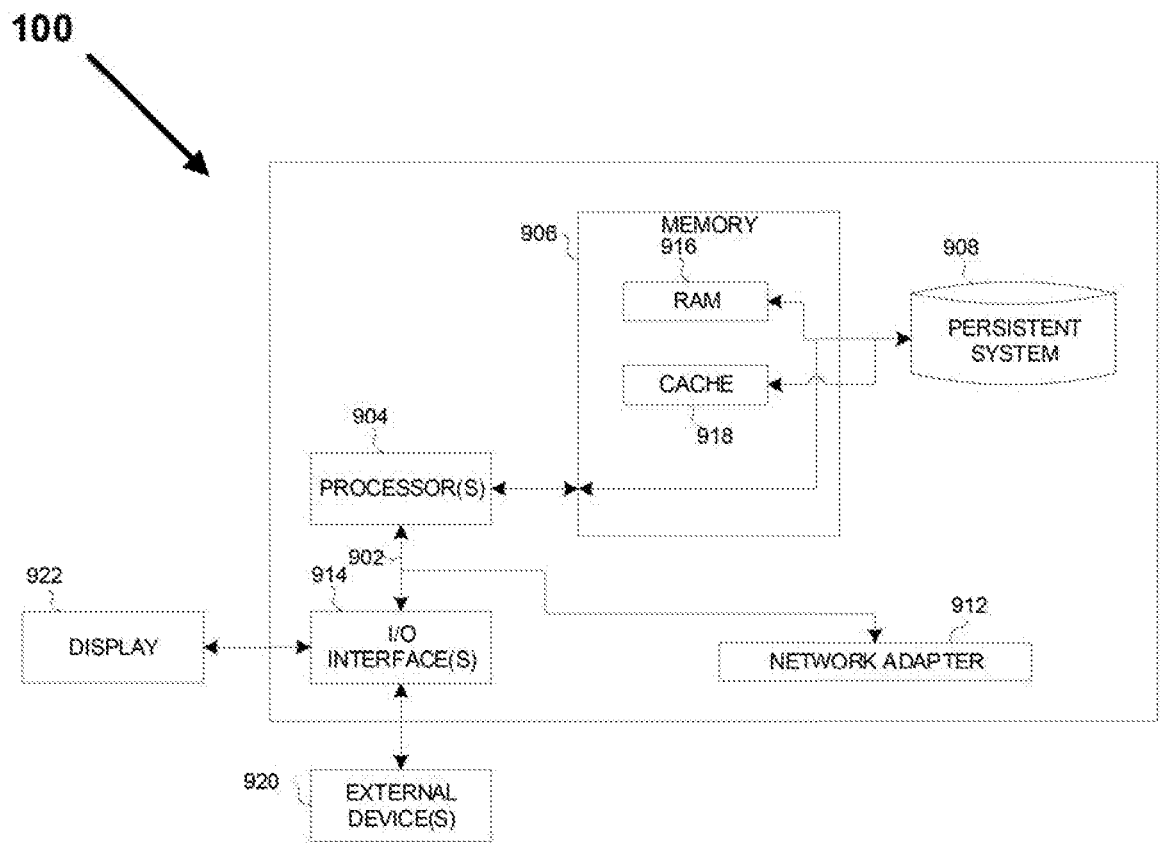
FIG. 3 is a block diagram depicting the hardware components of the UI rendering system of FIG. 1, in accordance with an embodiment of the invention.

FIG. 3 depicts a block diagram of components of the devices of rendering system 100, such as client device 110 and server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

A client device 110 and a server 140 include communications fabric 902, which provides communications between computer processor(s) 904, memory 906, persistent storage 908, communications unit 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

Rendering program 114 and user interface 112 in client device 110, and web page 142 in server 140 are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Communications unit 912, in these examples, provides for communications with other data processing systems or devices. In these examples, communications unit 912 includes one or more network interface cards. Communications unit 912 may provide communications through the use of either or both physical and wireless communications links. Rendering program 114 and user interface 112 in client device 140, and web page 142 in server 140 may be downloaded to persistent storage 908 through communications unit 912.

I/O interface(s) 914 allows for input and output of data with other devices that may be connected to client device 110 or server 140. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., rendering program 114 and user interface 112 in client device 110, and web page 142 in server 140 may be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for optimized user interface rendering on a client device, the method comprising:
    identifying one or more functional elements having a priority level, and one or more device characteristics of a device, wherein each one of the one or more functional elements is a segment of a computer software composed in one or more technology layers;

determining a hardware index that represents computation capabilities of the device;
determining a video index that represents video rendering capabilities of the device;
determining a selection index based on scaling a result of dividing the hardware index by the video index;
determining a first functional element of the one or more functional elements that has a highest priority level from the priority level;
determining whether there is an appropriate technology layer for the first functional element based on comparing the selection index to one or more technology layer ranges corresponding to one or more technology layers associated with the first functional element;
based on determining that there is an appropriate technology layer for the first functional element:
determining a second functional element of the one or more functional elements that has a next highest priority level from the priority level;
determining an appropriate technology layer for the second functional element based on comparing the selection index to one or more technology layer ranges corresponding to one or more technology layers associated with the second functional element;
determining a cumulative index based on the appropriate rendering index of the technology layer of the first functional element and the appropriate technology layer rendering index of the second functional element; and
determining whether there is another appropriate technology layer for the second functional element, based on determining whether another appropriate technology layer has a lower rendering index than the appropriate technology layer of the second functional element;
based on determining that there is another appropriate technology layer for the second functional element:
determining a first updated cumulative index based on the appropriate technology layer of the first functional element rendering index and the another appropriate technology layer rendering index of the second functional element;
determining that the first updated cumulative index does not exceed the hardware index; and
rendering the first functional element and the second functional element on the device.

2. The method of claim 1, further comprising:
based on determining that there is no appropriate technology layer for the first functional element:
determining that a second functional element of the one or more functional elements has a next highest priority level from the priority level;
determining that the second functional element has an appropriate technology layer for the second functional element based on comparing the selection index to one or more technology layer ranges corresponding to one or more technology layers associated with the second functional element.

3. The method of claim 2, further comprising:
based on determining that there is no appropriate technology layer for the first functional element excluding the first functional element from rendering.

4. The method of claim 1, further comprising:
based on determining that that the first updated cumulative index does not exceed the hardware index rendering the first functional element and the second functional element on the device.

5. The method of claim 1, further comprising:
based on determining that there is no another appropriate technology layer for the second functional element:
determining another technology layer of the first functional element that has a lower rendering index than the appropriate technology layer of the first functional element;
determining a second updated cumulative index based on the another appropriate technology layer of the first functional element rendering index and the appropriate technology layer of the second functional element rendering index; and
determining whether the second updated cumulative index exceeds the hardware index.

6. The method of claim 1, further comprising:
based on determining that the second updated cumulative index exceeds the hardware index:
excluding the second functional element from rendering;
determining that a third functional element of the one or more functional elements has a next highest priority level from the priority level;
determining an appropriate technology layer for the third functional element based on comparing the selection index to one or more technology layer ranges corresponding to one or more technology layers associated with the third functional element; and
determining a third updated cumulative index based on the appropriate technology layer of the first functional element and the appropriate technology layer of the third functional element;
determining that the third updated cumulative index does not exceed the hardware index; and
rendering the first functional element using the appropriate technology layer for the first functional element and the third functional element using the appropriate technology layer for the third functional element on the device.

7. A computer program product for optimized user interface rendering, the computer program product comprising:
one or more tangible computer-readable hardware storage devices and program instructions stored on at least one of the one or more tangible storage devices, the program instructions comprising:
program instructions to identify one or more functional elements having a priority level, and one or more device characteristics of a device, wherein each one of the one or more functional elements is a segment of a computer software composed in one or more technology layers;
program instructions to determine a hardware index that represents computation capabilities of the device;
program instructions to determine a video index that represents video rendering capabilities of the device;
program instructions to determine a selection index based on scaling a result of dividing the hardware index by the video index;
program instructions to determine a first functional element of the one or more functional elements that has a highest priority level from the priority level;
program instructions to determine whether there is an appropriate technology layer for the first functional element based on comparing the selection index to one or more technology layer ranges corresponding to one or more technology layers associated with the first functional element;
based on determining that there is an appropriate technology layer for the first functional element:
program instructions to determine a second functional element of the one or more functional elements that has a next highest priority level from the priority level;
program instructions to determine an appropriate technology layer for the second functional element based on comparing the selection index to one or more technology layer ranges corresponding to one or more technology layers associated with the second functional element;
program instructions to determine a cumulative index based on the appropriate rendering index of the technology layer of the first functional element and the appropriate technology layer rendering index of the second functional element; and
program instructions to determine whether there is another appropriate technology layer for the second functional element, based on determining whether another appropriate technology layer has a lower rendering index than the appropriate technology layer of the second functional element; and
based on determining that there is another appropriate technology layer for the second functional element:
program instructions to determine a first updated cumulative index based on the appropriate technology layer of the first functional element rendering index and the another appropriate technology layer rendering index of the second functional element;
program instructions to determine that the first updated cumulative index does not exceed the hardware index; and
program instructions to render the first functional element and the second functional element on the device.

8. The computer program product of claim 7, further comprising:
based on determining that there is no appropriate technology layer for the first functional element:
program instructions to determine that a second functional element of the one or more functional elements has a next highest priority level from the priority level;
program instructions to determine that the second functional element has an appropriate technology layer for the second functional element based on comparing the selection index to one or more technology layer ranges corresponding to one or more technology layers associated with the second functional element.

9. The computer program product of claim 8, further comprising:
based on determining that there is no appropriate technology layer for the first functional element program instructions to exclude the first functional element from rendering.

10. The computer program product of claim 7, further comprising:
based on determining that that the first updated cumulative index does not exceed the hardware index program instructions to render the first functional element and the second functional element on the device.

11. The computer program product of claim 7, further comprising:
based on determining that there is no another appropriate technology layer for the second functional element:
program instructions to determine another technology layer of the first functional element that has a lower rendering index than the appropriate technology layer of the first functional element;
program instructions to determine a second updated cumulative index based on the another appropriate technology layer of the first functional element rendering index and the appropriate technology layer of the second functional element rendering index; and
program instructions to determine whether the second updated cumulative index exceeds the hardware index.

12. The computer program product of claim 7, further comprising:
based on determining that the second updated cumulative index exceeds the hardware index:
program instructions to exclude the second functional element from rendering;
program instructions to determine that a third functional element of the one or more functional elements has a next highest priority level from the priority level;
program instructions to determine an appropriate technology layer for the third functional element based on comparing the selection index to one or more technology layer ranges corresponding to one or more technology layers associated with the third functional element; and
program instructions to determine a third updated cumulative index based on the appropriate technology layer of the first functional element and the appropriate technology layer of the third functional element;
program instructions to determine that the third updated cumulative index does not exceed the hardware index; and
program instructions to render the first functional element using the appropriate technology layer for the first functional element and the third functional element using the appropriate technology layer for the third functional element on the device.

13. A computer system for optimized user interface rendering, the computer system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:
program instructions to identify one or more functional elements having a priority level, and one or more device characteristics of a device, wherein each one of the one or more functional elements is a segment of a computer software composed in one or more technology layers;
program instructions to determine a hardware index that represents computation capabilities of the device;
program instructions to determine a video index that represents video rendering capabilities of the device;

program instructions to determine a selection index based on scaling a result of dividing the hardware index by the video index;
program instructions to determine a first functional element of the one or more functional elements that has a highest priority level from the priority level;
program instructions to determine whether there is an appropriate technology layer for the first functional element based on comparing the selection index to one or more technology layer ranges corresponding to one or more technology layers associated with the first functional element;
based on determining that there is an appropriate technology layer for the first functional element:
program instructions to determine a second functional element of the one or more functional elements that has a next highest priority level from the priority level;
program instructions to determine an appropriate technology layer for the second functional element based on comparing the selection index to one or more technology layer ranges corresponding to one or more technology layers associated with the second functional element;
program instructions to determine a cumulative index based on the appropriate rendering index of the technology layer of the first functional element and the appropriate technology layer rendering index of the second functional element; and
program instructions to determine whether there is another appropriate technology layer for the second functional element, based on determining whether another appropriate technology layer has a lower rendering index than the appropriate technology layer of the second functional element; and
based on determining that there is another appropriate technology layer for the second functional element:
program instructions to determine a first updated cumulative index based on the appropriate technology layer of the first functional element rendering index and the another appropriate technology layer rendering index of the second functional element;
program instructions to determine that the first updated cumulative index does not exceed the hardware index; and program instructions to render the first functional element and the second functional element on the device.

14. The computer system of claim 13, further comprising:
based on determining that there is no appropriate technology layer for the first functional element:
program instructions to determine that a second functional element of the one or more functional elements has a next highest priority level from the priority level;
program instructions to determine that the second functional element has an appropriate technology layer for the second functional element based on comparing the selection index to one or more technology layer ranges corresponding to one or more technology layers associated with the second functional element.

15. The computer system of claim 13, further comprising:
based on determining that there is no appropriate technology layer for the first functional element program instructions to exclude the first functional element from rendering.

16. The computer system of claim 13, further comprising:
based on determining that that the first updated cumulative index does not exceed the hardware index program instructions to render the first functional element and the second functional element on the device.

17. The computer system of claim 13, further comprising:
based on determining that there is no another appropriate technology layer for the second functional element:
program instructions to determine another technology layer of the first functional element that has a lower rendering index than the appropriate technology layer of the first functional element;
program instructions to determine a second updated cumulative index based on the another appropriate technology layer of the first functional element rendering index and the appropriate technology layer of the second functional element rendering index; and
program instructions to determine whether the second updated cumulative index exceeds the hardware index.

* * * * *